(12) United States Patent
Thacker

(10) Patent No.: US 7,481,480 B2
(45) Date of Patent: Jan. 27, 2009

(54) PICKUP BED COVER

(76) Inventor: Gary Thacker, 5255 N. Avenida Largo, Tucson, AZ (US) 85745

( * ) Notice: Subject to any disclaimer, the term of this patent is extended or adjusted under 35 U.S.C. 154(b) by 367 days.

(21) Appl. No.: 11/397,536

(22) Filed: Apr. 3, 2006

(65) Prior Publication Data

US 2006/0244283 A1      Nov. 2, 2006

Related U.S. Application Data

(60) Provisional application No. 60/675,523, filed on Apr. 27, 2005.

(51) Int. Cl.
*B60P 7/02* (2006.01)
(52) U.S. Cl. .................................. 296/100.06
(58) Field of Classification Search ............ 296/100.01, 296/100.02, 100.06, 100.07, 100.08
See application file for complete search history.

(56) References Cited

U.S. PATENT DOCUMENTS

| | | | | |
|---|---|---|---|---|
| 3,155,423 A * | 11/1964 | Cripe | ................... | 296/100.08 |
| 3,360,294 A * | 12/1967 | Cieslak | ....................... | 296/165 |
| 3,649,073 A * | 3/1972 | Whittemore | ........... | 296/100.08 |
| 5,203,364 A * | 4/1993 | Koole | ......................... | 135/148 |
| 5,364,154 A * | 11/1994 | Kaiser | .................... | 296/100.07 |
| 5,366,266 A * | 11/1994 | Harbison | ................ | 296/100.02 |
| 5,375,900 A * | 12/1994 | Tessenyi et al. | ......... | 296/100.08 |
| 6,086,134 A * | 7/2000 | Cravens et al. | ......... | 296/100.06 |
| 6,209,944 B1 * | 4/2001 | Billiu et al. | ............. | 296/100.02 |
| 6,227,592 B1 * | 5/2001 | Thacker | ................... | 296/26.07 |
| 6,572,174 B2 * | 6/2003 | Hernandez et al. | ...... | 296/100.09 |
| 6,666,490 B1 * | 12/2003 | Thacker | ................... | 296/26.07 |
| 6,712,418 B1 * | 3/2004 | Lathers | .................. | 296/100.02 |

\* cited by examiner

*Primary Examiner*—H Gutman
(74) *Attorney, Agent, or Firm*—Mark Ogram

(57) ABSTRACT

The truck bed cover which utilizes legs swivelly mounted to the bed of the truck. In an open position, the cover is raised and extends over the rear tailgate of the bed; in a closed position, the cover encloses the bed. The invention utilizes a closing mechanism that enables the user to easily lower the cover from the raised position. The closing mechanism, in one embodiment, serves as a locking mechanism to hold the cover in the raised position.

19 Claims, 3 Drawing Sheets

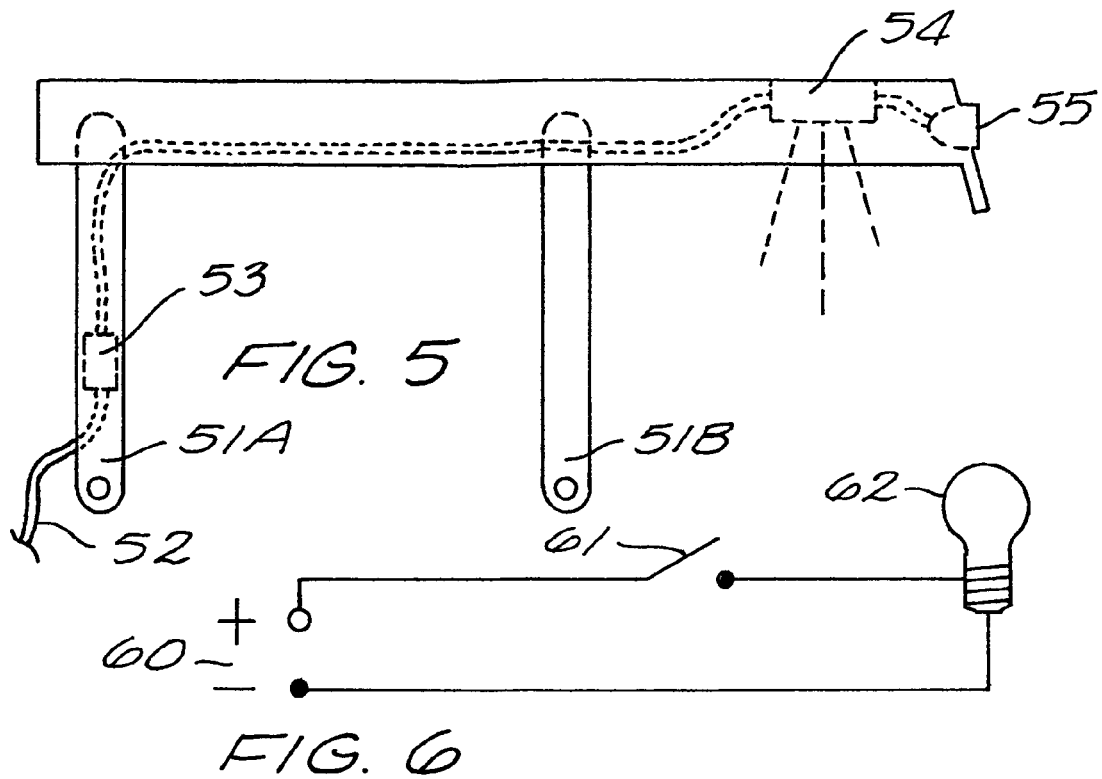
FIG. 5
FIG. 6
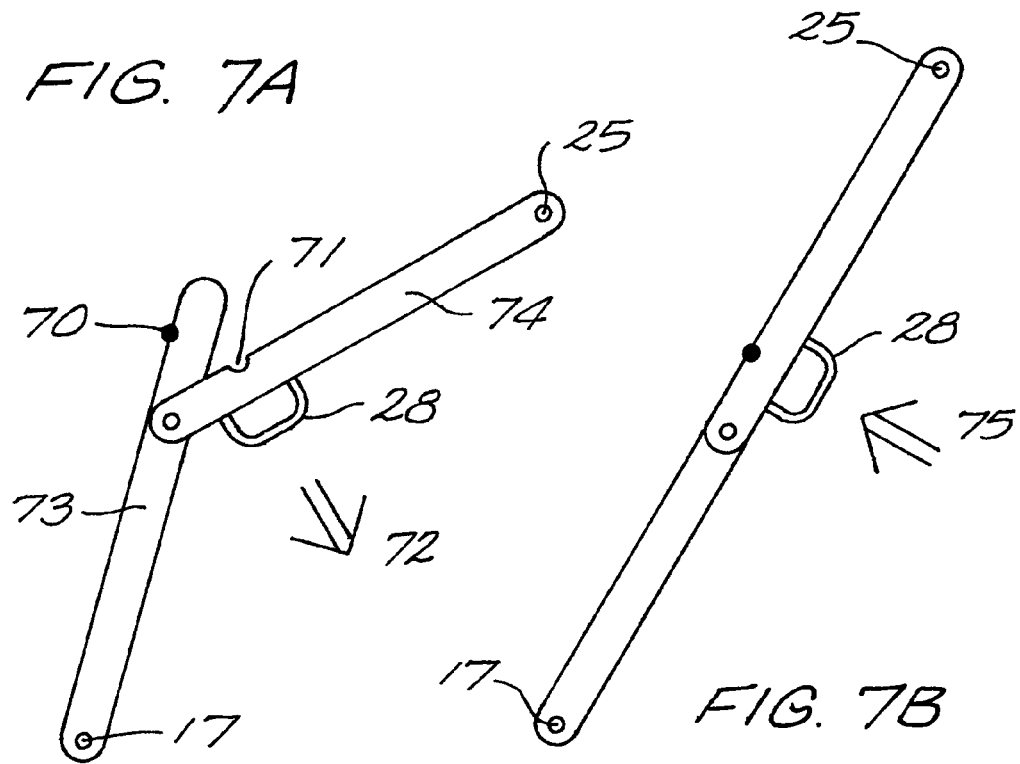
FIG. 7A
FIG. 7B

PICKUP BED COVER

Priority for this patent application is claimed from Provisional patent application Ser. No. 60/675,523, filed on Apr. 27, 2005, and entitled, "Pickup Bed Cover".

BACKGROUND OF THE INVENTION

This invention relates generally to truck bed covers and more particularly to security or hard tonneau covers for pickups.

This particular invention relates to a cover that raises and lowers with the assistance of gas springs or other types of springs. The invention is not intended to be restricted to a particular type of pickup nor to a particular cover.

While the use of a gas spring to assist with the movement of a pickup bed security bed cover is the preferred embodiment, those of ordinary skill in the art readily recognize that other types of springs are also usable in this context.

Moving the cover to a raised position with the assist of springs is a simple engineering matter; by selecting and fitting springs to counter balance the weight of the cover and lifting legs, movement to a raised position is facilitated.

While springs do assist in raising the cover, the problem is in closing the cover from a raised position. Because of internal friction in the springs, the springs often require more force to close than they do in extending. This difference in required force is only exacerbated because of the position of the cover in a raised position; the cover is over the user's head in the open position. When the cover is mounted on a tall pickup (such as a 4×4) or when the user is significantly shorter than the raised cover, the task of closing the cover is made only more difficult.

Another problem which pickup bed covers encounter is the ability to lock the cover in the raised position. Without this capability, when the pickup is driven with cover raised to accommodate bulky cargo, the cover tends to close when the pickup stops.

It is clear there is a significant need to create an easy to use mechanism for the closing of pickup bed covers and in locking pickup bed covers in the raised postion.

SUMMARY OF THE INVENTION

The present invention provides a mechanism which permits the user to lock the cover in the raised position. This permits the user to travel with the cover fully opened to accommodate bulky cargo without having problems with inadvertent "closure" of the cover when the pickup stops.

The invention, in general, is a mechanism that shortens the distance between the rear edge of the cover and the lower hinge point region of the rear lifting (the general regions above the taillights of the pickup). The mechanism gives the user a mechanical advantage in closing the cover. This mechanism also serves as a means to hold the cover in the raised position, to enable the user to drive with the cover raised.

The invention is adapted to work on a variety of cover mechanisms, such as, but not limited to: U.S. Pat. No. 6,666,490, entitled, "Pickup Bed Cover" issued to Thacker on Dec. 23, 2003; U.S. Pat. No. 6,227,592, entitled "Pickup Bed Cover" issued to Thacker on May 8, 2001; and U.S. Pat. No. 5,354,154 issued to Kaiser on Nov. 15, 1994; all of which are incorporated hereinto by reference.

More specifically, in the preferred embodiment, the resulting pickup bed assembly of this invention employs a traditional pickup bed having a forward, rear, left and right edge. The cover is solid and is shaped to extend over the entirety of the pickup bed. As such, the cover has a forward and rear edge together with a left and right edge.

When "open" the cover is supported by four legs. The positioning of the legs permit the cover to move forward and downward (to a closed position) or rearward and upward (to an open position) along a center line of the pickup bed.

To accomplish this movement, in the preferred embodiment, one end of the first leg is swivelly secured proximate to the left edge of said solid cover and towards the forward edge of the solid cover, with the other end of the first leg swivelly secured proximate to a mid-point of the left edge of the pickup bed.

The second leg has one end swivelly secured proximate to the right edge of the cover and proximate to the forward edge of said solid cover with its other end swivelly secured proximate to a mid-point of the right edge of the pickup bed.

The third leg has one end swivelly secured proximate to a mid-point of the left edge of the cover and the other end swivelly secured proximate to the left edge of the pickup bed near the rear edge of the pickup bed.

The fourth leg has one of its ends swivelly secured proximate to a mid-point of the right edge of the cover, and an opposing end swivelly secured to the right edge of the pickup bed near the rear edge of the pickup bed.

This arrangement permits the cover to be raised/lowered along a centerline of the pickup bed.

In one embodiment of the invention, the first and second legs are part of a "U" shaped bracket; in similar fashion, the third and fourth legs are part of an other "U" shaped bracket.

The invention, together with various embodiments thereof, will be more fully explained by accompanying drawings and following descriptions thereof.

DRAWINGS IN BRIEF

FIG. 5 is a side view of an alternative embodiment of the invention.

FIG. 6 is an electrical schematic of the lighting system.

FIGS. 7A and 7B illustrate the preferred closing mechanism of the invention.

DRAWINGS IN DETAIL

Figure 1:
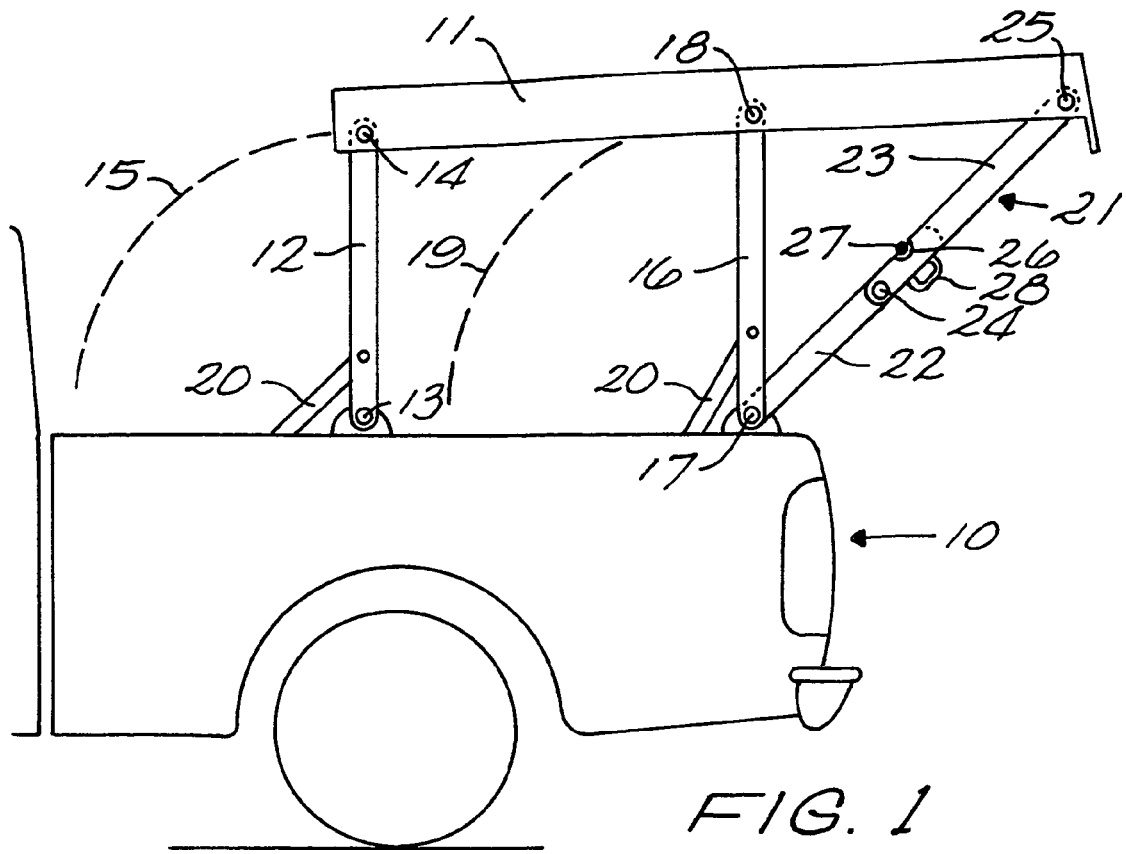
FIG. 1 is a side view of the operation of the preferred embodiment of the invention in an "open" or raised position.

FIG. 1 is a side view of the operation of the preferred embodiment of the invention in an "open" or raised position.

Referring to FIG. 1, the preferred embodiment of the invention, cover 11 of pickup bed 10 is shown in the fully raised position. Front legs 12 are swivelly attached to truck bed 10 at lower front hinge point 13. Front legs 12 are swivelly attached to cover 11 at upper front hinge point 14.

Upper hinge point 14 travels through an arc 15. Likewise, rear legs 16 are swivelly attached to truck bed 10 at lower rear hinge point 17 and to cover 11 at upper center hinge point 18. Center hinge point 18 travels through arc 19.

In the preferred embodiment, gas springs 20 are utilized to counter-balance the weight of cover 11, front legs 12 and rear legs 16. In this manner, gas springs 20 assist the user in opening cover 11. Other embodiments of the invention employ the use of steel springs or other types of springs.

Closing mechanism 21 gives the user a mechanical advantage in closing cover 11, by decreasing the distance between the upper rear hinge point 25, and lower rear hinge point 17.

In this particular embodiment of the invention, closing linkage 21 acts on lower rear hinge point 17. This particular arrangement provides for excellent economy of manufacturing. Those of ordinary skill in the art readily recognize that closing linkage 21 may be attached to any other hinge point in the region of lower rear hinge point 17 or to rear leg 16.

Lower closing linkage 22 is shown swivelly attached to lower rear hinge point 17 and extending diagonally upward to the rear and is ultimately attached to upper closing linkage 23 at closing linkage center hinge 24. Upper closing linkage 23 is swivelly attached to cover 11 at upper rear hinge point 25, and joins with the lower closing linkage 22 at closing linkage center hinge point 24.

Upper closing linkage 23 extends beyond closing linkage center hinge point 24, with the lower end shown in dotted form behind lower closing linkage 22. This extension of upper closing linkage 23 is to provide a location for latch (inside the lower end of upper closing linkage 23).

As cover 11 reaches the fully open position, latch 26 engages striker bolt 27 (located on lower closing linkage 22) to lock cover 11 in the open position. With latch 26 engaged to striker 27, closing linkage 21 is held in a generally straight position, holding lower rear hinge point 17, upper center hinge point 18, and upper rear hinge point 22 in a triangle to lock cover 11 in an open position.

The user lowers cover 11 by releasing latch 26 from striker 27 and pushing forward on handle 28.

Figure 2:
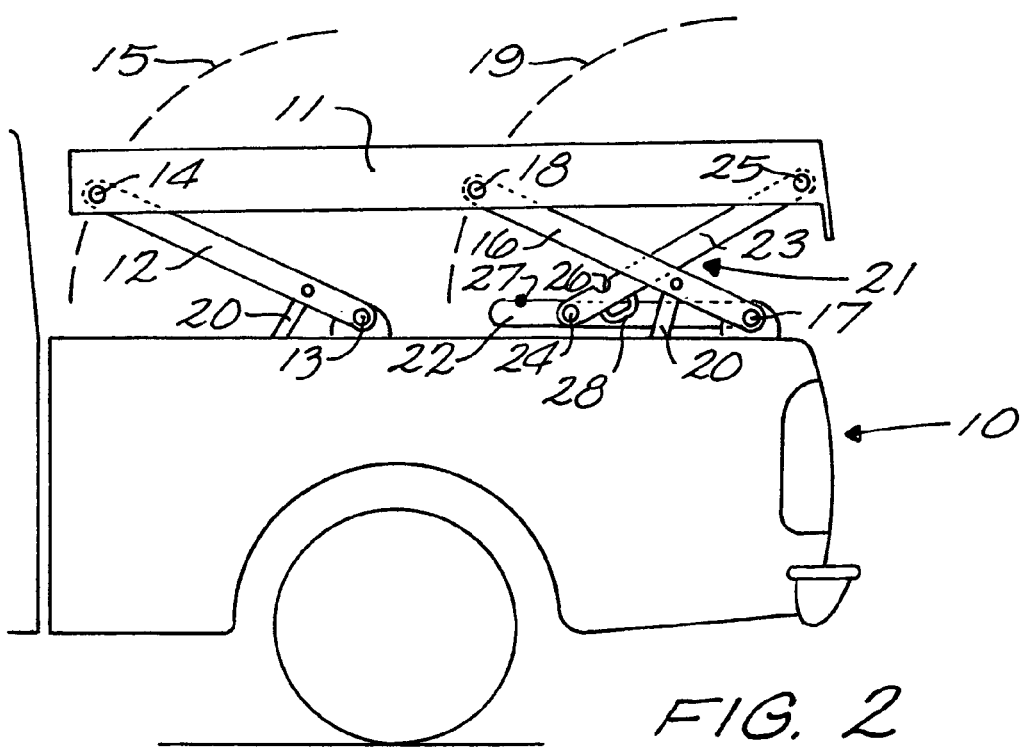
FIG. 2 illustrates the preferred embodiment of the invention moving to a "closed" or lowered position.

FIG. 2 illustrates the preferred embodiment of the invention moving to a "closed" or lowered position.

In FIG. 2, cover 11 is shown halfway closed to pickup bed 10.

As cover 11, front legs 12 and rear legs 16 travel forward and downward along arcs 15 and 19, closing linkage 21 folds at closing linkage center hinge point 24. Upper closing linkage 23 is shown in dotted form inside cover 11. Latch 26 may be seen separated from striker 27.

It has been found that closing linkage 21 gives the user a mechanical advantage to easily close cover 11 against the force of springs 20. At the half closed position (shown in FIG. 2), closing linkage 21 has served its purpose and cover 11 is easy to close by pushing down on the rear of cover 11.

A single closing linkage 21 works effectively when mounted to either side of cover 11 and pickup bed 10. An alternative embodiment of the invention acts on both sides of cover 11 and pickup bed 10.

Figure 3:
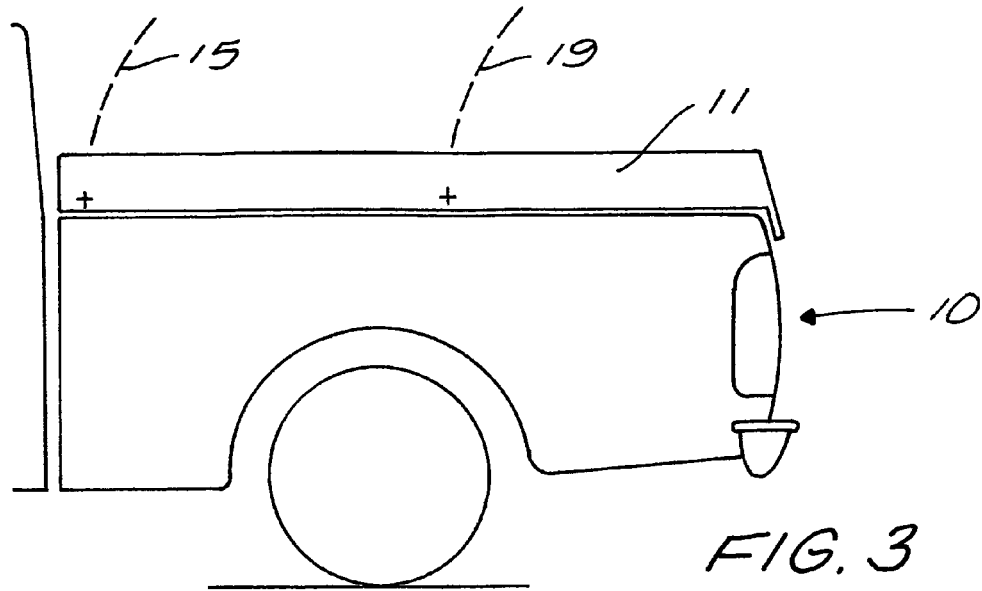
FIG. 3 illustrates the preferred embodiment in a "closed" position.

FIG. 3 illustrates the preferred embodiment in a "closed" position.

In FIG. 3, cover 11 is shown fully closed to pickup bed 10, having traveled down arcs 15 and 19.

It is understood that closing linkage 21 is possible in many different embodiments. The preferred embodiment is described herein.

While the present invention provides a great many beneficial attributes, an important utility of this invention is that closing linkage 21 acts to reduce the distance between the rear of cover 11 and the general region of lower rear hinge points 17. Closing linkage 21 may be swivelly attached to a variety of positions on rear legs 16, cover 11, and behind center hinge point 18 to reduce the distance between the attaching points and achieve the desired results.

Another advantage of the present invention is that closing linkage 21 acts as a means of holding the cover in the raised position.

Figure 4:
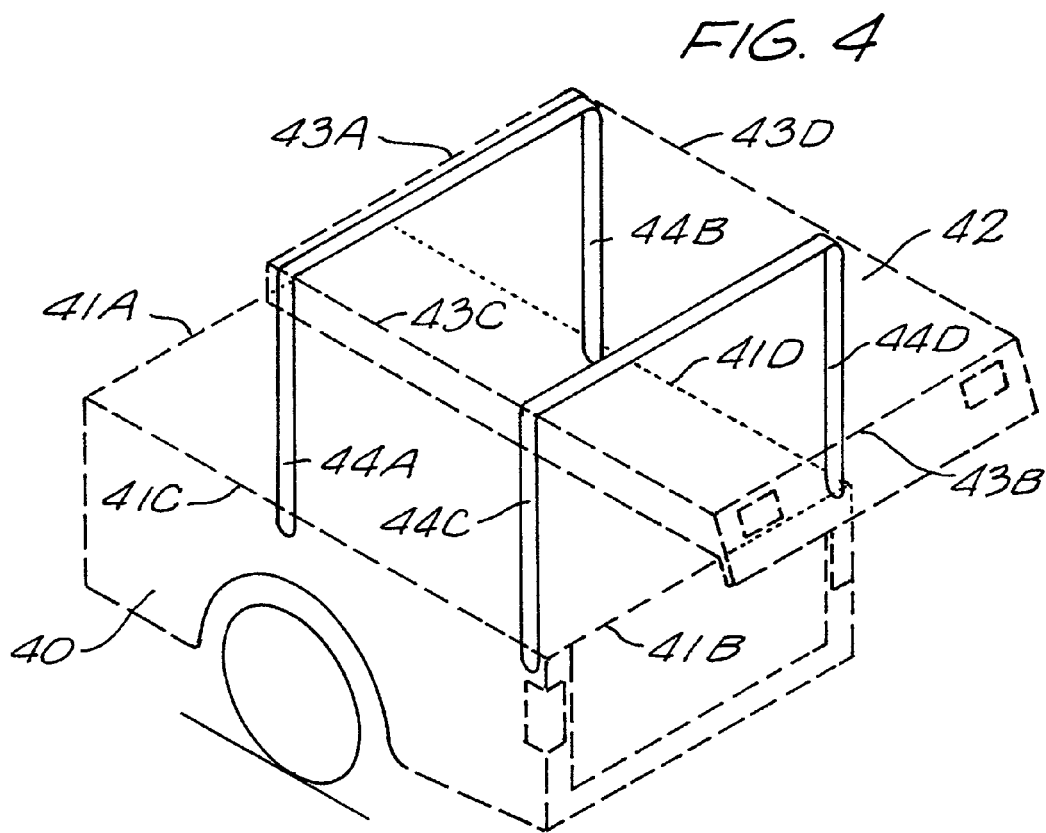
FIG. 4 is a perspective view of an alternative embodiment of the invention.

FIG. 4 is a perspective view of an alternative embodiment of the invention.

This embodiment of the invention uses two "U" shaped brackets which create the four legs of the invention.

Pickup bed 40 has a forward 41A, rear 41B, left 41C and right edge 41D.

Cover 42 is solid and is shaped to extend over the entirety of the pickup bed 40. Cover 42 has a forward 43A and rear edge 43B together with a left 43C and a right edge 43D.

When "open" the cover is supported by four legs 44A, 44B, 44C, and 44D. The positioning of the legs permit the cover to move forward (to a closed position) or rearward (to an open position- as shown) along a center line of the pickup bed.

One end of leg 44A is swivelly secured the cover 42 on the left edge 43C near forward edge 43A. The other end of leg 44A is swivelly to the pickup bed around the mid-point of the left edge 41C of pickup bed 40.

Leg 44B is swivelly connected at one end to cover 42 proximate to right edge 43D near forward edge 43A; the other end of leg 44B is swivelly secured around a mid-point of the right edge 41D of the pickup bed 40.

Leg 44C is swivelly attached to cover 42 around a mid-point of the left edge 43C. The opposing end of leg 44C is swivelly secured to the left edge 41C of pickup bed 40 near the rear edge 41B.

The fourth leg 44D has one of its ends swivelly secured proximate to a mid-point of the right edge 43D of cover 42. The other end of leg 44D is swivelly secured to the right edge 41D of pickup bed 40 near the rear edge 41B of the pickup bed 40.

This arrangement permits the cover to be raised/lowered along a centerline of the pickup bed.

FIG. 5 is a side view of an alternative embodiment of the invention.

In this side view, only legs 51A and 51B are shown supporting cover 50; those of ordinary skill in the art readily recognize that four legs are used in this context.

Electrical wire 52 extends from the truck's battery (not shown) and communicates electricity to switch 53. Switch 53, in this embodiment, is a position sensing switch such as a mercury switch which closes the circuit when leg 51A is in an upright position (thereby indicating that cover 50 is in an "open" position).

When switch 53 is closed, electricity flows to downward facing light 54 (used to illuminate the work area) and to horizontal facing light 55. Light 55, in the preferred embodiment, has a red or amber lense and is used to warn traffic of the position of the truck and its workers.

In other embodiments of the invention, light 55 is wired to the tail lights of the pickup. This provides additional braking lights (when the cover is "closed) as well as emergency flashers (when the cover is "open") creating heightened safety for the workers in the area.

FIG. 6 is an electrical schematic of the lighting system.

The wiring associated with the lights of FIG. 5 involves attachment between battery 60 and switch 61. While the embodiment of FIG. 5 used a positional switch, other switches are also contemplated including, but not limited to, user activated and button switches (which are activated when pressed by a part of the assembly).

Switch 61, when closed, communicates electricity to light 62 which completes the circuit by returning to the ground side of battery 60.

FIGS. 7A and 7B illustrate the preferred closing mechanism of the invention.

Referencing FIG. 7A, the closing mechanism is made up of linkage 73 and linkage 74 which are swivelly connected to each other. Linkage 74 is swivelly secured to the rear portion of the cover (not shown) at point 25; and linkage 73 is secured to the rear of the pickup bed (not shown) at point 17.

By gripping handle 28 and pulling, as indicated by arrow 72, linkage 73 and linkage 74 are pulled into a linear relationship permitting pin 70 to engage with latch 71 (as indicated in FIG. 7B). Once in the open position, the operator is able to push handle 28 as indicated by arrow 75 to disengage pin 70 from latch 71 to close the cover.

It is clear that the present invention provides for a highly improved mechanism for securing a pickup bed cover in an open position and also for easing the difficulty in closing a pickup bed cover.

What is claimed is:

1. A pickup bed assembly comprising:
   a) a pickup bed having a forward, rear, left and right edge;
   b) a solid cover shaped to extend over the entirety of the pickup bed, said solid cover having a forward edge, a rear edge, a left edge and right edge;
   c) a first, second, third, and fourth leg,
      1) said first leg having,
         A) a first end swivelly secured proximate to the left edge of said solid cover and proximate to the forward edge of said solid cover, and,
         B) a second end swivelly secured proximate to a mid-point of the left edge of said pickup bed,
      2) said second leg having,
         A) a first end swivelly secured proximate to the right edge of said solid cover and proximate to the forward edge of said solid cover, and,
         B) a second end swivelly secured proximate to a mid-point of the right edge of said pickup bed,
      3) said third leg having,
         A) a first end swivelly secured proximate to a mid-point of the left edge of said solid cover and,
         B) a second end swivelly secured proximate to the left edge of said pickup bed proximate to the rear edge of said pickup bed, and,
      4) said fourth leg having,
         A) a first end swivelly secured proximate to a mid-point of the right edge of said solid cover, and,
         B) a second end swivelly secured proximate to the right edge of said pickup bed proximate to the rear edge of said pickup bed; and,
   d) a closing mechanism having,
      1) a first linkage having a first end and a second end, the first end of said first linkage being swivelly secured proximate to the rear edge of said pickup bed, and,
      2) a second linkage having a first end and a second end,
         A) the first end of said second linkage being swivelly secured proximate to the second end of said first linkage, and,
         B) the second end of said second linkage being swivelly secured proximate to a rear edge of said solid cover.

2. The pickup bed assembly according to claim 1, further including a locking mechanism configured to selectively secure said first linkage with said second linkage.

3. The pickup bed assembly according to claim 2, further including a handle secured to said first linkage proximate to the second end thereof.

4. The pickup bed assembly according to claim 2, further including a handle secure to said second linkage proximate to the first end thereof.

5. The pickup bed assembly according to claim 2, further including at least one light secured proximate to the rear edge of said solid cover.

6. The pickup bed assembly according to claim 5, further including a switch activating said at least one light when said locking mechanism is engaged.

7. The pickup bed assembly according to claim 6, wherein said at least one light is directed to emit light horizontally from the rear edge of said pickup bed.

8. The pickup bed assembly according to claim 7, wherein said at least one light includes a red filter.

9. The pickup bed assembly according to claim 6, wherein said at least one light is directed downward.

10. The pickup bed assembly according to claim 5,
    a) wherein said pickup bed includes at least two brake lights; and,
    b) wherein said at least one light secured proximate to the rear edge of said cover is on an electrical circuit with said at least two brake lights.

11. The pickup bed assembly according to claim 1, further including at least one gas spring secured to a selected leg being one of said first, second, third, or fourth legs and said pickup bed at a selected point such that said at least one gas spring provides pressure against said selected leg tending to press said selected leg away from said selected point.

12. The pickup bed assembly according to claim 1,
    a) wherein said first leg and said second leg are secured to each other in a U shape; and,
    b) wherein said third leg and said fourth leg are secured to each other in a U shape.

13. A pickup bed cover for a pickup bed having a forward, rear, left and right edge, said pickup bed cover comprising:
    a) a cover having a forward edge, a rear edge, a left edge and right edge;
    b) a first U bracket creating a first leg and a second leg, said first U bracket swivelly secured proximate to a forward edge of said cover, an end of the first leg configured to be swivelly secured proximate to the left edge of the pickup bed and proximate to a mid-point of the pickup bed, an end of the second leg configured to be swivelly secured proximate to the right edge of the pickup bed and proximate to a mid-point of the left edge and the right edge of the pickup bed;
    c) a second U bracket creating a third leg and a fourth leg, said second U bracket swivelly secured proximate to a mid-line of said cover, said third leg adapted to be swivelly secured to the left edge of said pickup bed proximate to the rear edge of said pickup bed, said fourth leg adapted to be swivelly secured to the right edge of said pickup bed proximate to a rear of said pickup bed; and
    d) a closing mechanism having:
       1) a first linkage having a first end swivelly secured to the rear edge of the pickup bed; and,
       2) a second linkage having a first end swivelly secured to a second end of said first linkage, and, a second end swivelly secured to the rear edge of said solid cover.

14. The pickup bed cover according to claim 13, further including a locking mechanism configured to selectively secure said first linkage with said second linkage.

15. The pickup bed cover according to claim 14, further including at least one gas spring being secured at a first end thereof to a selected one of said first, second, third or fourth leg and adapted to be swivelly connected to said pickup bed.

16. A pickup bed cover comprising:
a) a solid cover;
b) at least four legs swivelly secured to said solid cover, each of said four legs adapted to be swivelly secured to a pickup bed having a forward, read, left and right edge such that said solid cover, when attached to said pickup bed via said at least four legs, moves in line with a center line extending from a front of said pickup bed to a rear of said pickup bed; and,
c) a closing mechanism having,
  1) a first linkage having a first end swivelly secured to the rear of the pickup bed, and,
  2) a second linkage having a first end swivelly secured to a second end of said first linkage, and, a second end swivelly secured to a rear edge of said solid cover.

17. The pickup bed cover according to claim 16, wherein, said closing mechanism is adapted, when secured to said pickup bed, to selectively secure said solid cover at a maximum distance from said pickup bed.

18. The pickup bed cover according to claim 16, wherein said at least four legs includes:
a) a first leg having a first end swivelly secured proximate to the left edge of said solid cover and proximate to the forward edge of said solid cover;
b) a second leg having a first end swivelly secured proximate to the right edge of said solid cover and proximate to the forward edge of said solid cover;
c) a third leg having a first end swivelly secured proximate to a mid-point of the left edge of said solid cover; and,
d) said fourth leg having a first end swivelly secured proximate to a mid-point of the right edge of said solid cover.

19. The pickup bed cover according to claim 18:
a) wherein a second end of said first leg is adapted to be swivelly secured proximate to a mid-point of a left edge of said pickup bed;
b) wherein a second end of said second leg is adapted to be swivelly secured proximate to a mid-point of a right edge of said pickup bed;
c) wherein a second end of said third leg is adapted to be swivelly secured proximate to the left edge of said pickup bed proximate to a rear edge of said pickup bed; and,
d) wherein a second end of said fourth leg is adapted to be swivelly secured proximate to the right edge of said pickup bed proximate to a rear edge of said pickup bed.

* * * * *